(12) United States Patent
Rader

(10) Patent No.: US 10,562,783 B2
(45) Date of Patent: Feb. 18, 2020

(54) PROCESSING OF ALUMINA

(71) Applicant: FUJIMI INCORPORATED, Aichi (JP)

(72) Inventor: W. Scott Rader, Tualatin, OR (US)

(73) Assignee: FUJIMI INCORPORATED, Aichi (JP)

( * ) Notice: Subject to any disclaimer, the term of this patent is extended or adjusted under 35 U.S.C. 154(b) by 990 days.

(21) Appl. No.: 14/918,433

(22) Filed: Oct. 20, 2015

(65) Prior Publication Data

US 2017/0107115 A1    Apr. 20, 2017

(51) Int. Cl.
| | |
|---|---|
| *B02C 23/06* | (2006.01) |
| *C01F 7/02* | (2006.01) |
| *C09G 1/00* | (2006.01) |
| *C09G 1/02* | (2006.01) |

(52) U.S. Cl.
CPC .............. *C01F 7/023* (2013.01); *B02C 23/06* (2013.01); *C01F 7/026* (2013.01); *C09G 1/02* (2013.01); *C01P 2004/61* (2013.01); *C01P 2006/22* (2013.01)

(58) Field of Classification Search
CPC ..... B02C 23/06; B02C 23/18; C04B 35/6261; C04B 35/62625
USPC ...................................... 241/15, 16
See application file for complete search history.

(56) References Cited

U.S. PATENT DOCUMENTS

| | | | |
|---|---|---|---|
| 5,236,471 A | 8/1993 | Van Dijen | |
| 9,138,704 B2 * | 9/2015 | Rai | ................... B01F 17/0007 |
| 2002/0095872 A1 * | 7/2002 | Tsuchiya | ................... C09G 1/02 51/307 |
| 2006/0210799 A1 * | 9/2006 | Maki | ................... B82Y 30/00 428/402 |
| 2007/0021292 A1 * | 1/2007 | Maki | ................... C01F 7/02 501/153 |
| 2008/0264299 A1 | 10/2008 | Lortz | |
| 2009/0180976 A1 * | 7/2009 | Seeney | ................... A61K 8/11 424/59 |
| 2012/0160944 A1 * | 6/2012 | Dodd | ................... A01N 25/12 241/30 |
| 2013/0056566 A1 * | 3/2013 | Guillot | ................... C09C 1/021 241/16 |

FOREIGN PATENT DOCUMENTS

| | | |
|---|---|---|
| JP | 2008-156146 | 7/2008 |
| JP | 2009-500288 A | 1/2009 |

OTHER PUBLICATIONS

Singh, B. P., Menchavez, R., Takai, C., Fuji, M., & Takahashi, M. "Stability of dispersions of colloidal alumina particles in aqueous suspensions." (2005). Journal of Colloid and Interface Science, 291(1), 181-186.*

* cited by examiner

*Primary Examiner* — Shelley M Self
*Assistant Examiner* — Katie L. Parr
(74) *Attorney, Agent, or Firm* — Foley & Lardner LLP

(57) ABSTRACT

Described herein are stable aqueous dispersions of alumina; methods of decreasing the viscosity of an alumina slurry; methods of decreasing the D50 of an alumina slurry; and methods of decreasing the level of hard packing in an alumina slurry, where the slurry comprises alumina feed material, water, and a dispersant agent.

14 Claims, No Drawings

PROCESSING OF ALUMINA

BACKGROUND

Due to its hardness and strength, aluminum oxide, or alumina, is commonly used as an abrasive. Disclosed herein are improved methods of processing or milling alumina, as well as compositions and methods of using the same.

SUMMARY OF THE INVENTION

Some embodiments described and disclosed herein are based at least in part upon the unexpected discovery of improved milling methods for alumina, as well as the products produced and methods of using those products. It has been surprisingly discovered that, among other things, the invented methods can result (i) in an increased rate of size reduction during alumina processing when done in the presence of one or more specific milling aids; (ii) in unexpectedly lower viscosity of the resultant milled alumina dispersion in the presence of the one or more specific milling aids, and (iii) in a reduction in the degree of hard settling (or hard packing) of the resultant milled alumina dispersion in the presence of the one or more specific milling aids. Any of the above advantages and any others resulting from the methods can result in improved alumina milling and in alumina products with unique properties and uses.

In one aspect, disclosed herein are methods of preparing a stable aqueous dispersion of alumina particles, which method can include, for example, processing a slurry comprising alumina feed material, water, and a dispersant agent, wherein the alumina concentration is less than 55 wt. % (or any sub range or sub value below that number); and the dispersant agent concentration is more than 0.01 wt. %; and wherein the dispersant agent has two or more carboxyl groups (COOH) and one or more hydroxyl groups (OH). In some embodiments, the dispersant agent concentration can be less than or equal to 10 wt. %. In some embodiments, the dispersant agent can be, for example, an alpha hydroxyl dicarboxylic acid. In some embodiments, the dispersant agent can be, for example, one or more of malic acid, citramalic acid, citric acid, isocitric acid, tartaric acid, and tartronic acid, and the like. In some embodiments, the processing can include milling. In some embodiments, the milling is conducted by ball milling. In some embodiments, the milling is conducted by bead milling. In some embodiments, the milling is conducted by bead milling. In some embodiments, the milling can be conducted, for example, for a period of 15 minutes to 24 hours, or any sub range or sub value there between. In some embodiments, the slurry can have, for example, a pH value greater than 7 (including any specific pH value above that number being contemplated in increments of at least one tenth). In some embodiments, the slurry can have, for example, a solids content of greater than 40 wt. %. In some embodiments, the dispersion has a viscosity of about 1 cps to about 40 cps, or any sub range or sub value there between. In some embodiments, the alumina particles in the dispersion can have a particle size, for example, of greater than 0.5 μm.

In another aspect, disclosed herein are methods of increasing the rate of particle reduction in an alumina milling process, which process, can include, for example, milling a slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH). In some embodiments, the dispersant agent concentration can be, for example, less than or equal to 10 wt. %. In some embodiments, the dispersant agent can be an alpha hydroxyl dicarboxylic acid or the like. In some embodiments, the dispersant agent can be one or more of malic acid, citramalic acid, citric acid, isocitric acid, tartaric acid, and tartronic acid, and the like. In some embodiments, the milling can be conducted for a period of 15 minutes to 24 hours, or any sub range or sub value there between. In some embodiments, the slurry comprising alumina feed material, water, and the dispersant agent can have a pH value greater than 7.

In another aspect, disclosed herein are methods of decreasing the viscosity of an alumina slurry to less than about 40 cps, which methods can include, for example, milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH). In some embodiments, the dispersant agent concentration can be, for example, less than or equal to 10 wt. %. In some embodiments, the dispersant agent can be, for example, an alpha hydroxyl dicarboxylic acid, or a like molecule. In some embodiments, the dispersant agent can be, for example, one or more of malic acid, citramalic acid, citric acid, isocitric acid, tartaric acid, and tartronic acid. In some embodiments, the milling can be conducted for a period of, for example, 15 minutes to 24 hours, or any sub range or sub value there between. In some embodiments, the slurry has a pH value greater than 7. In some embodiments, the slurry can have a D50 of less than about 5.0 μm.

In another aspect, disclosed herein are methods of decreasing the D50 of an alumina slurry to less than about 5.0 μm, which methods can include, for example, milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH). In some embodiments, the dispersant agent concentration can be, for example, less than or equal to 10 wt. %. In some embodiments, the dispersant agent can be, for example, an alpha hydroxyl dicarboxylic acid. In some embodiments, the dispersant agent can be for example, one or more of malic acid, citramalic acid, citric acid, isocitric acid, tartaric acid, and tartronic acid, or the like. In some embodiments, the milling can be conducted for a period of 15 minutes to 24 hours, for example, or any sub range or sub value there between. In some embodiments, the slurry has a pH value greater than 7.

In another aspect, disclosed herein are methods of decreasing the level of hard packing in an alumina slurry, which methods can include, for example, milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH). In some embodiments, the dispersant agent concentration can be, for example, less than or equal to 10 wt. %. In some embodiments, the dispersant agent can be, for example, an alpha hydroxyl dicarboxylic acid or the like. In some embodiments, the dispersant agent can be, for example, one or more of malic acid, citramalic acid, citric acid, isocitric acid, tartaric acid, and tartronic acid, or the like. In some embodiments, the milling can be, for example, conducted for a period of 15 minutes to 24 hours, or any sub range or sub value there between. In some embodiments, the slurry can have a pH value greater than 7. In some embodiments, the slurry can have a D50 of less than about 5.0 μm.

In another aspect, disclosed herein are aqueous dispersions of alumina prepared according to any method disclosed herein.

In another aspect, disclosed herein are alumina slurry compositions comprising an alumina having a milling process content of greater than 40 wt. %, and a dispersant agent, wherein the dispersant agent has two or more carboxyl groups (COOH) and one or more hydroxyl groups (OH). In some embodiments, the dispersant agent concentration can be, for example, less than or equal to 10 wt. %. In some embodiments, the dispersant agent can be, for example, an alpha hydroxyl dicarboxylic acid, or the like. In some embodiments, the dispersant agent can be, for example, one or more of malic acid, citramalic acid, citric acid, isocitric acid, tartaric acid, and tartronic acid, or the like.

DETAILED DESCRIPTION

Alumina is widely used as an abrasive and is found in products such as sandpaper, toothpaste, and CD/DVD polishing and scratch repair kits. Alumina has also found use in the electronics industry for the fine polishing of silicon wafers. Such polishing requires high quality alumina, with a narrow size distribution and low particle size.

As described herein, it was unexpectedly discovered that (i) the rate of size reduction during alumina processing is increased in the presence of one or more specific milling aids; (ii) the viscosity of the resultant milled alumina dispersion has an unexpectedly lower viscosity in the presence of the one or more specific milling aids, and (iii) the degree of hard settling (or hard packing) of the resultant milled alumina dispersion is reduced in the presence of the one or more specific milling aids. Hard settling (or hard packing), as determined qualitatively herein, is a measurement of the difficulty to re-suspend a dispersion that has been allowed to settle for at least 24 hours. In some embodiments, the resultant milled alumina dispersions remain suspended during long-term storage. In some embodiments, the resultant milled alumina dispersions are allowed to settle for up to about 12 months and are easily re-suspended. In some embodiments, the one or more specific milling aids can be a dispersant agent. In some embodiments, the dispersant agent is has two or more carboxyl groups (COOH) and one or more hydroxyl groups (OH).

Without being bound to any one particular theory, it is believed that the aluminum hydroxide, aluminum hydro-oxide, or hydrated aluminum oxide (normally generated during the milling process) complexes with the dispersant agent which contains two or more carboxyl groups and one or more hydroxyl groups. This complexation may prevent the aluminum hydroxide/aluminum hydro-oxide/hydrated aluminum oxide from coordinating with either molecular water on the surface of the alumina or the hydroxide on the surface between particles. Lack of the latter interaction may prevent bridging of particles through hydrogen bonding. Such hydrogen bonding may generate higher viscosity as well as hard settling of the slurry.

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH). In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH). In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH).

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH). In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH). In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH).

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH). In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH). In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH).

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is more than 0.01 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is more than 0.01 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is more than 0.01 wt. %; and wherein the dispersant agent is selected from a group consisting of malic acid, citramalic acid, citric acid, isocitric acid, tartaric acid, and tartronic acid.

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.5 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent is selected from a group consisting of malic acid, citramalic acid, citric acid, isocitric acid, tartaric acid, and tartronic acid).

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.3 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent is selected from a group consisting of malic acid, citramalic acid, citric acid, isocitric acid, tartaric acid, and tartronic acid. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent is selected from a group consisting of malic acid, citramalic acid, citric acid, isocitric acid, tartaric acid, and tartronic acid.

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH); and the slurry has a pH value greater than 7.

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.5 wt. %; and wherein the dispersant agent has two or more carboxyl groups (COOH) and one or more hydroxyl groups (OH); and the slurry has a pH value greater than 7.

Provided herein, in some embodiments, are methods of preparing a stable aqueous dispersion of alumina particles comprising processing a slurry comprising alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles comprise processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH); and the slurry has a pH value greater than 7. In some embodiments, the methods of preparing a stable aqueous dispersion of alumina particles consist essentially of processing a slurry consisting essentially of alumina feed material, water, and a dispersant agent, wherein the alumina concentration is less than 55 wt. %; and the dispersant agent concentration is about 0.01 wt. % to about 0.3 wt. %; and wherein the dispersant agent has two or more carboxyl groups (COOH) and one or more hydroxyl groups (OH); and the slurry has a pH value greater than 7.

In another aspect are methods of increasing the rate of particle reduction in an alumina milling process. In some embodiments, the method comprises milling a slurry comprising alumina feed material, water, and a dispersant agent. In some embodiments, the method comprises milling a slurry comprising alumina feed material, water, and a dispersant agent; wherein the alumina concentration is less than 55 wt. % and the dispersant agent concentration is more than 0.01 wt. %. In further embodiments, the dispersant agent has two or more carboxyl groups (COOH) and one or more hydroxyl groups (OH). In some embodiments, the slurry has a pH value greater than 7.

In another aspect are methods of decreasing the D50 of an alumina slurry. In some embodiments, the method comprises milling the slurry comprising alumina feed material, water, and a dispersant agent. In further embodiments, the method decreases the D50 of the alumina slurry to less than about 5.0 µm. In some embodiments, the alumina concentration is less than 55 wt. % and the dispersant agent concentration is more than 0.01 wt. %. In still further embodiments, the dispersant agent has two or more carboxyl groups (COOH) and one or more hydroxyl groups (OH). In some embodiments, the slurry has a pH value greater than 7.

In another aspect are methods of decreasing the viscosity of an alumina slurry. In some embodiments, the method comprises milling the slurry comprising alumina feed material, water, and a dispersant agent. In further embodiments, the method decreases the viscosity of the alumina slurry to less than about 40 cps. In some embodiments, the alumina concentration is less than 55 wt. % and the dispersant agent concentration is more than 0.01 wt. %. In still further embodiments, the dispersant agent has two or more carboxyl groups (COOH) and one or more hydroxyl groups (OH). In some embodiments, the slurry has a pH value greater than 7.

In another aspect are methods of decreasing the level of hard packing in an alumina slurry. In some embodiments, the method comprises milling the slurry comprising alumina feed material, water, and a dispersant agent. In some embodiments, the alumina concentration is less than 55 wt. % and the dispersant agent concentration is more than 0.01 wt. %. In still further embodiments, the dispersant agent has two or more carboxyl groups (COOH) and one or more hydroxyl groups (OH). In some embodiments, the slurry has a pH value greater than 7.

In some embodiments, compared to a dispersant agent with one carboxyl group (COOH) and one or more hydroxyl groups (OH), a dispersant agent with two or more carboxyl groups (COOH) and one or more hydroxyl groups (OH) is better able to do one or more of the following: (i) decrease the viscosity of an alumina slurry; (ii) decrease the D50 of an alumina slurry; and (iii) decrease the level of hard packing in an alumina slurry. In some embodiments, compared to a dispersant agent with one carboxyl group (COOH) and no hydroxyl groups (OH), a dispersant agent with two or more carboxyl groups (COOH) and one or more hydroxyl groups (OH) is better able to do one or more of the following: (i) decrease the viscosity of an alumina slurry; (ii) decrease the D50 of an alumina slurry; and (iii) decrease the level of hard packing in an alumina slurry.

In some embodiments, the dispersant agent has two or more carboxyl groups (COOH) and one or more hydroxyl groups (OH). Examples of the dispersant agent include, but are not limited to, citric acid and alpha hydroxyl dicarboxylic acids. In some embodiments, the dispersant agent is an alpha hydroxyl dicarboxylic acid (or alpha hydroxy dicarboxylic acid) or a salt thereof. Examples of an alpha hydroxyl dicarboxylic acid include, but are not limited to, malic acid, citramalic acid, isocitric acid, tartaric acid, and tartronic acid. In some embodiments, the dispersant agent is selected from a group consisting of malic acid, citramalic acid, citric acid, isocitric acid, tartaric acid, tartronic acid, and any salt thereof, and any combination thereof. In some embodiments, the dispersant agent is selected from a group consisting of malic acid, citramalic acid, citric acid, isocitric acid, tartaric acid, and tartronic acid. In some embodiments, the dispersant agent is malic acid. In some embodiments, the dispersant agent is citramalic acid. In some embodiments, the dispersant agent is citric acid. In some embodiments, the dispersant agent is isocitric acid. In some embodiments, the dispersant agent is tartaric acid. In some embodiments, the dispersant agent is tartronic acid. In some embodiments, the dispersant agent is malic acid, citric acid, or tartaric acid. In some embodiments, the dispersant agent is citramalic acid, isocitric acid, tartaric acid, or tartronic acid. In some embodiments, one or more of the above listed organic acids can be specifically excluded from the methods.

In some embodiments, the dispersant agent has two carboxyl groups (COOH) and one or more hydroxyl groups (OH). In some embodiments, the dispersant agent has two carboxyl groups (COOH) and one hydroxyl group (OH). In some embodiments, the dispersant agent has two carboxyl groups (COOH) and two hydroxyl groups (OH). In some embodiments, the dispersant agent has three carboxyl groups (COOH) and one or more hydroxyl groups (OH). In some embodiments, the dispersant agent has three carboxyl groups (COOH) and one hydroxyl group (OH). In some embodiments, the dispersant agent has four carboxyl groups (COOH) and one or more hydroxyl groups (OH).

In some embodiments, the dispersant agent concentration in the slurry is less than or equal to 10 wt. %. In some embodiments, the dispersant agent concentration in the slurry is less than 10 wt. %. In some embodiments, the dispersant agent concentration in the slurry is equal to 10 wt. %. In some embodiments, the dispersant agent concentration in the slurry is about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 wt. %, including increments therein. In some embodiments, the dispersant agent concentration in the slurry is more than 0.01 wt. %. In some embodiments, the dispersant agent concentration in the slurry is more than 0.01 wt. % and less than or equal to 10 wt. %. In some embodiments, the dispersant agent concentration in the slurry is more than 0.1 wt. % and less than or equal to 10 wt. %. In some embodiments, the dispersant agent concentration in the slurry is about 0.01 wt. % to about 10 wt. %. In some embodiments, the dispersant agent concentration in the slurry is about 0.01 wt. % to about 5 wt. %. In some embodiments, the dispersant agent concentration in the slurry is about 0.01 wt. % to about 2 wt. %. In some embodiments, the dispersant agent concentration in the slurry is about 0.01 wt. % to about 1 wt. %. In some embodiments, the dispersant agent concentration in the slurry is about 0.01 wt. % to about 0.5 wt. %. In some embodiments, the dispersant agent concentration in the slurry is about 0.01 wt. % to about 0.4 wt. %. In some embodiments, the dispersant agent concentration in the slurry is about 0.01 wt. % to about 0.2 wt. %. In some embodiments, the dispersant agent concentration in the slurry is about 0.01 wt. % to about 0.1 wt. %. In some embodiments, the dispersant agent concentration in the slurry is about 0.02 wt. % to about 10 wt. %. In some embodiments, the dispersant agent concentration in the slurry is about 0.02 wt. % to about 5 wt. %. In some embodiments, the dispersant agent concentration in the slurry is about 0.02 wt. % to about 2 wt. %. In some embodiments, the dispersant agent concentration in the slurry is about 0.02 wt. % to about 1 wt. %. In some embodiments, the dispersant agent concentration in the slurry is about 0.02 wt. % to about 0.5 wt. %. In some embodiments, the dispersant agent concentration in the slurry is about 0.02 wt. % to about 0.4 wt. %. In some embodiments, the dispersant agent concentration in the slurry is about 0.02 wt. % to about 0.2 wt. %. In some embodiments, the dispersant agent concentration in the slurry is about 0.02 wt. % to about 0.1 wt. %. In some embodiments, the dispersant agent concentration in the slurry is about 0.05 wt. % to about 10 wt. %. In some embodiments, the dispersant agent concentration in the slurry is about 0.05 wt. % to about 5 wt. %. In some embodiments, the dispersant agent concentration in the slurry is about 0.05 wt. % to about 2 wt. %. In some embodiments, the dispersant agent concentration in the slurry is about 0.05 wt. % to about 1 wt. %. In some embodiments, the dispersant agent concentration in the slurry is about 0.05 wt. % to about 0.5 wt. %. In some embodiments, the dispersant agent concentration in the slurry is about 0.05 wt. % to about 0.4 wt. %. In some embodiments, the dispersant agent concentration in the slurry is about 0.05 wt. % to about 0.2 wt. %. In some embodiments, the dispersant agent concentration in the slurry is about 0.05 wt. % to about 0.1 wt. %. In some embodiments, the dispersant agent concentration in the slurry is about 0.1 wt. % to about 10 wt. %. In some embodiments, the dispersant agent concentration in the slurry is about 0.1 wt. % to about 5 wt. %. In some embodiments, the dispersant agent concentration in the slurry is about 0.1 wt. % to about 2 wt. %. In some embodiments, the dispersant agent concentration in the slurry is about 0.1 wt. % to about 1 wt. %. In some embodiments, the dispersant agent concentration in the slurry is about 0.1 wt. % to about 0.5 wt. %. In some embodiments, the dispersant agent concentration in the slurry is about 0.1 wt. % to about 0.4 wt. %. In some embodiments, the dispersant agent concentration in the slurry is about 0.1 wt. % to about 0.2 wt. %.

In some embodiments, the slurry has a pH value of about 7. In some embodiments, the slurry has a pH value greater than 7. In some embodiments, the slurry has a pH value of 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, or 11.0, including increments therein. In some embodiments, the slurry has a pH value of about 7.1 to about 11.0. In some embodiments, the slurry has a pH value of about 7.1 to about 10.5. In some embodiments, the slurry has a pH value of about 7.1 to about 10.0. In some embodiments, the slurry has a pH value of about 7.5 to about 11.0. In some embodiments, the slurry has a pH value of about 7.5 to about 10.5. In some embodiments, the slurry has a pH value of about 7.5 to about 10.0. In some embodiments, the slurry has a pH value of about 8.0 to about 11.0. In some embodiments, the slurry has a pH value of about 8.0 to about 10.5. In some embodiments, the slurry has a pH value of about 8.0 to about 10.0. In some embodiments, the slurry has a pH value of about 8.5 to about 11.0. In some embodiments, the slurry has a pH value of about 8.5 to about 10.5. In some embodiments, the slurry has a pH value of about 8.5 to about 10.0. In some embodiments, the slurry has a pH value of about 9.0 to about 11.0. In some embodiments, the slurry has a pH value of about 9.0 to about 10.5. In some embodiments, the slurry has a pH value of about 9.0 to about 10.0.

In some embodiments, the slurry comprising alumina feed material, water, and a dispersant agent has a solids content of greater than 30%. In some embodiments, the slurry comprising alumina feed material, water, and a dispersant agent has a solids content of greater than 35%. In some embodiments, the slurry comprising alumina feed material, water, and a dispersant agent has a solids content of greater than 40%. In some embodiments, the slurry comprising alumina feed material, water, and a dispersant agent has a solids content of greater than 45%. In some embodiments, the slurry comprising alumina feed material, water, and a dispersant agent has a solids content of greater than 50%. In some embodiments, the slurry comprising alumina feed material, water, and a dispersant agent has a solids content of greater than 55%. In some embodiments, the slurry comprising alumina feed material, water, and a dispersant agent has a solids content of greater than 60%. In some embodiments, the slurry comprising alumina feed material, water, and a dispersant agent has a solids content of about 30, 35, 40, 45, 50, 55, or 60%, or any increment thereof.

Processing

In some embodiments, the processing of a slurry comprises milling, wherein the slurry comprises alumina feed material, water, and a dispersant agent. Milling includes, but is not limited to, attrition milling, vibratory milling, bead milling, and ball milling. In some embodiments, the milling is selected from attrition milling, vibratory milling, bead milling, and ball milling. In some embodiments, the milling is attrition milling. In some embodiments, the milling is vibratory milling. In some embodiments, the milling is bead milling. In some embodiments, the milling is ball milling.

In some embodiments, the milling is conducted for a period of about 0.1, 0.15, 0.2, 0.25, 0.3, 0.35, 0.40, 0.45, 0.5, 0.55, 0.6, 0.65, 0.7, 0.75, 0.8, 0.85, 0.9, 0.95, 1, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59. 60 hours, including increments therein. In some embodiments, the milling is conducted for a period of about 15 minutes to about 120 hours. In some embodiments, the milling is conducted for a period of about 15 minutes to about 24 hours. In some embodiments, the milling is conducted for a period of about 15 minutes to about 10 hours.

In some embodiments, the milling is conducted for a period of about 15 minutes to about 9 hours. In some embodiments, the milling is conducted for a period of about 15 minutes to about 8 hours. In some embodiments, the milling is conducted for a period of about 15 minutes to about 7 hours. In some embodiments, the milling is conducted for a period of about 15 minutes to about 6 hours. In some embodiments, the milling is conducted for a period of about 15 minutes to about 5 hours. In some embodiments, the milling is conducted for a period of about 15 minutes to about 4 hours. In some embodiments, the milling is conducted for a period of about 15 minutes to about 3 hours. In some embodiments, the milling is conducted for a period of about 15 minutes to about 2 hours. In some embodiments, the milling is conducted for a period of about 15 minutes to about 1 hour. In some embodiments, the milling is conducted for a period of about 30 minutes to about 10 hours. In some embodiments, the milling is conducted for a period of about 30 minutes to about 9 hours. In some embodiments, the milling is conducted for a period of about 30 minutes to about 8 hours. In some embodiments, the milling is conducted for a period of about 30 minutes to about 7 hours. In some embodiments, the milling is conducted for a period of about 30 minutes to about 6 hours. In some embodiments, the milling is conducted for a period of about 30 minutes to about 5 hours. In some embodiments, the milling is conducted for a period of about 30 minutes to about 4 hours. In some embodiments, the milling is conducted for a period of about 30 minutes to about 3 hours. In some embodiments, the milling is conducted for a period of about 30 minutes to about 2 hours. In some embodiments, the milling is conducted for a period of about 30 minutes to about 1 hour. In some embodiments, the milling is conducted for a period of about 1 to about 10 hours. In some embodiments, the milling is conducted for a period of about 1 hour to about 9 hours. In some embodiments, the milling is conducted for a period of about 1 hour to about 8 hours. In some embodiments, the milling is conducted for a period of about 1 hour to about 7 hours. In some embodiments, the milling is conducted for a period of about 1 hour to about 6 hours. In some embodiments, the milling is conducted for a period of about 1 hour to about 5 hours. In some embodiments, the milling is conducted for a period of about 1 hour to about 4 hours. In some embodiments, the milling is conducted for a period of about 1 hour to about 3 hours. In some embodiments, the milling is conducted for a period of about 1 hour to about 2 hours. In some embodiments, the milling is conducted for a period of about 2 hours to about 10 hours. In some embodiments, the milling is conducted for a period of about 2 hours to about 8 hours. In some embodiments, the milling is conducted for a period of about 2 hours to about 6 hours. In some embodiments, the milling is conducted for a period of about 3 hours to about 10 hours. In some embodiments, the milling is conducted for a period of about 3 hours to about 9 hours. In some embodiments, the milling is conducted for a period of about 3 hours to about 12 hours. In some embodiments, the milling is conducted for a period of about 3 hours to about 18 hours. In some embodiments, the milling is conducted for a period of about 3 hours to about 24 hours. In some embodiments, the milling is conducted for a period of about 12 hours to about 24 hours. In some embodiments, the milling is conducted for a period of about 12 hours to about 36 hours. In some embodiments, the milling is conducted for a period of about 12 hours to about 48 hours. In some embodiments, the milling is conducted for a period of about 12 hours to about 60 hours. In some embodiments, the milling is conducted for a period of about 12 hours to about 72 hours. In some embodiments, the milling is conducted for a period of about 12 hours to about 84 hours. In some embodiments, the milling is conducted for a period of about 12 hours to about 96 hours. In some embodiments, the milling is conducted for a period of about 12 hours to about 108 hours. In some embodiments, the milling is conducted for a period of about 12 hours to about 120 hours. In some embodiments, the milling is conducted for a period of about 24 hours to about 96 hours. In some embodiments, the milling is conducted for a period of about 24 hours to about 120 hours.

In some embodiments, the processing of the slurry further comprises performing a grading process. In some embodiments, the grading process comprises separating different particle sizes using water. In some embodiments, the milling aid in the slurry does not affect the grading process. In some embodiments, the milling aid is removed from the slurry during the grading process. In some embodiments, the processing of the slurry still further comprises re-introducing the milling aid into the slurry after performing the grading process.

Properties of the Dispersion

In one aspect, disclosed herein are stable aqueous dispersions of alumina. These dispersions are prepared using methods disclosed herein.

In some embodiments, the viscosity of the stable aqueous dispersion of alumina is less than about 40 cps. In some embodiments, the viscosity of the stable aqueous dispersion of alumina is less than about 35 cps. In some embodiments, the viscosity of the stable aqueous dispersion of alumina is less than about 30 cps. In some embodiments, the viscosity of the stable aqueous dispersion of alumina is less than about 25 cps. In some embodiments, the viscosity of the stable aqueous dispersion of alumina is less than about 20 cps. In some embodiments, the viscosity of the stable aqueous dispersion of alumina is less than about 15 cps. In some embodiments, the viscosity of the stable aqueous dispersion of alumina is more than about 1 cps. In some embodiments, the viscosity of the stable aqueous dispersion of alumina is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 cps, including increments therein. In some embodiments, the viscosity of the stable aqueous dispersion of alumina is more than 1 cps and less than 40 cps. In some embodiments, the viscosity of the stable aqueous dispersion of alumina is about 1 cps to about 40 cps. In some embodiments, the viscosity of the stable aqueous dispersion of alumina is about 1 cps to about 35 cps. In some embodiments, the viscosity of the stable aqueous dispersion of alumina is about 1 cps to about 30 cps. In some embodiments, the viscosity of the stable aqueous dispersion of alumina is about 1 cps to about 25 cps. In some embodiments, the viscosity of the stable aqueous dispersion of alumina is about 1 cps to about 20 cps. In some embodiments, the viscosity of the stable aqueous dispersion of alumina is about 1 cps to about 15 cps. In some embodiments, the viscosity of the stable aqueous dispersion of alumina is about 5 cps to about 40 cps. In some embodiments, the viscosity of the stable aqueous dispersion of alumina is about 5 cps to about 35 cps. In some embodiments, the viscosity of the stable aqueous dispersion of alumina is about 5 cps to about 30 cps. In some embodiments, the viscosity of the stable aqueous dispersion of alumina is about 5 cps to about 25 cps. In some embodiments, the viscosity of the stable aqueous dispersion of alumina is about 5 cps to about 20 cps. In some embodiments, the viscosity of the stable aqueous dispersion of alumina is about 5 cps to about 15 cps.

In some embodiments, the D50 of the stable aqueous dispersion of alumina is less than about 5.0 µm. In some embodiments, the D50 of the stable aqueous dispersion of alumina is less than about 4.0 µm. In some embodiments, the D50 of the stable aqueous dispersion of alumina is less than about 3.0 µm. In some embodiments, the D50 of the stable aqueous dispersion of alumina is less than about 2.0 µm. In some embodiments, the D50 of the stable aqueous dispersion of alumina is less than about 1.0 µm. In some embodiments, the D50 of the stable aqueous dispersion of alumina is about 0.1 to about 5 µm. In some embodiments, the D50 of the stable aqueous dispersion of alumina is about 0.1 to about 4 µm. In some embodiments, the D50 of the stable aqueous dispersion of alumina is about 0.1 to about 3 µm. In some embodiments, the D50 of the stable aqueous dispersion of alumina is about 0.1 to about 2 µm. In some embodiments, the D50 of the stable aqueous dispersion of alumina is about 0.1 to about 1 µm. In some embodiments, the D50 of the stable aqueous dispersion of alumina is about 0.2 to about 5 µm. In some embodiments, the D50 of the stable aqueous dispersion of alumina is about 0.2 to about 4 µm. In some embodiments, the D50 of the stable aqueous dispersion of alumina is about 0.2 to about 3 µm. In some embodiments, the D50 of the stable aqueous dispersion of alumina is about 0.2 to about 2 µm. In some embodiments, the D50 of the stable aqueous dispersion of alumina is about 0.2 to about 1 µm. In some embodiments, the D50 of the stable aqueous dispersion of alumina is about 0.5 to about 5 µm. In some embodiments, the D50 of the stable aqueous dispersion of alumina is about 0.5 to about 4 µm. In some embodiments, the D50 of the stable aqueous dispersion of alumina is about 0.5 to about 3 µm. In some embodiments, the D50 of the stable aqueous dispersion of alumina is about 0.5 to about 2 µm. In some embodiments, the D50 of the stable aqueous dispersion of alumina is about 0.5 to about 1.5 µm. In some embodiments, the D50 of the stable aqueous dispersion of alumina is less than the D50 of an aqueous dispersion of alumina obtained by an analogous procedure but excluding the use of a dispersant agent described herein.

In some embodiments, the alumina particles in the dispersion have a particle size of at least about 0.1 µm. In some embodiments, the alumina particles in the dispersion have a particle size of greater than about 0.1 µm. In some embodiments, the alumina particles in the dispersion have a particle size of greater than about 0.2 µm. In some embodiments, the alumina particles in the dispersion have a particle size of greater than about 0.3 µm. In some embodiments, the alumina particles in the dispersion have a particle size of greater than about 0.4 µm. In some embodiments, the alumina particles in the dispersion have a particle size of greater than about 0.5 µm. In some embodiments, the alumina particles in the dispersion have a particle size of greater than about 0.6 µm. In some embodiments, the alumina particles in the dispersion have a particle size of greater than about 0.7 µm. In some embodiments, the alumina particles in the dispersion have a particle size of greater than about 0.8 µm. In some embodiments, the alumina particles in the dispersion have a particle size of greater than about 0.9 µm. In some embodiments, the alumina particles in the dispersion have a particle size of greater than about 1.0 µm.

In some embodiments, the viscosity of the stable aqueous dispersion of alumina is less than about 40 cps and the D50 of the stable aqueous dispersion of alumina is less than about 5.0 µm. In some embodiments, the viscosity of the stable aqueous dispersion of alumina is less than about 35 cps and the D50 of the stable aqueous dispersion of alumina is less than about 5.0 µm. In some embodiments, the viscosity of the stable aqueous dispersion of alumina is less than about 30 cps and the D50 of the stable aqueous dispersion of alumina is less than about 5.0 µm. In some embodiments, the viscosity of the stable aqueous dispersion of alumina is less than about 25 cps and the D50 of the stable aqueous dispersion of alumina is less than about 5.0 µm. In some embodiments, the viscosity of the stable aqueous dispersion of alumina is less than about 20 cps and the D50 of the stable aqueous dispersion of alumina is less than about 5.0 µm. In some embodiments, the viscosity of the stable aqueous dispersion of alumina is less than about 15 cps and the D50 of the stable aqueous dispersion of alumina is less than about 5.0 µm.

In another aspect, disclosed herein are alumina slurry compositions comprising an alumina having a milling process content of greater than 40 wt. %, and a dispersant agent, wherein the dispersant agent has two or more carboxyl groups (COOH) and one or more hydroxyl groups (OH). In some embodiments, the dispersant agent concentration is less than or equal to 10 wt. %. In some embodiments, the dispersant agent concentration is less than or equal to 1 wt. %. In some embodiments, the dispersant agent concentration is less than or equal to 0.5 wt. %. In some embodiments, the dispersant agent concentration is less than or equal to 0.3 wt. %. In some embodiments, the dispersant agent is an alpha hydroxyl dicarboxylic acid. In some embodiments, the dispersant agent is selected from a group consisting of malic acid, citramalic acid, citric acid, isocitric acid, tartaric acid, and tartronic acid.

In some embodiments, the alumina slurry compositions consist essentially of an alumina having a milling process content of greater than 40 wt. %, water, and a dispersant agent, wherein the dispersant agent has two or more carboxyl groups (COOH) and one or more hydroxyl groups (OH). In some embodiments, the alumina slurry compositions consist essentially of an alumina having a milling process content of greater than 40 wt. %, water, and a dispersant agent, wherein the dispersant agent has two or more carboxyl groups (COOH) and one or more hydroxyl groups (OH), the dispersant agent concentration is less than or equal to 0.5 wt. %, and the composition has a pH value of greater than 7.

Use of the Alumina Dispersions

The produced alumina dispersions can be used in any suitable manner. For example, the dispersions can be shipped for use in their "wet" state, for example, due to their improved stability and/or decreased hard settling characteristics. In some embodiments, the dispersions are transported by rail or road without significant hard settling during transport. The dispersions may be dried and used as they customarily are used by those of skill in the art. In some embodiments, the alumina dispersions prepared using the methods disclosed herein are used for polishing applications. In some embodiments, the alumina dispersions prepared using the methods disclosed herein have low viscosity and better handling. Handling of the alumina dispersions includes, but is not limited to, pumping, mixing, and transporting the alumina dispersions.

The examples herein are provided to illustrate advantages of the present technology. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

EXAMPLES

Example 1. Viscosity Levels of Alumina Dispersions With or Without Dispersant Agent Seven 100-gram dispersions were prepared containing 45% alumina ($Al_2O_3$) in water and varying amounts of a dispersant agent selected from malic acid, citric acid, and tartaric acid. Thirteen 100-gram comparative examples were also prepared containing 45% alumina in water. These comparative example dispersions contained either no dispersant agent or varying amounts of a dispersant agent selected from boric acid, maleic acid, acetic acid, or oxalic acid. Both sets of dispersions were milled (table top ball mill, Paul O. Abbe, model # LJRM202421) for 12 hours at 250 RPM. After milling, viscosity of each of the twenty dispersions was qualitatively assessed by the naked eye using the following guidelines: 1=thin, 2=medium thickness, 3=thick, 4=very thick. Results of this study are listed in Table 1.

TABLE 1

| Ex. | Dispersant agent | Wt. % of dispersant | # of $CO_2H$ groups | # of OH groups | pH of dispersion | viscosity |
|---|---|---|---|---|---|---|
| 1 | malic acid | 0.025 | 2 | 1 | 9.7 | 1 |
| 2 | malic acid | 0.050 | 2 | 1 | 9.2 | 1 |
| 3 | citric acid | 0.036 | 3 | 1 | 9.3 | 1 |
| 4 | citric acid | 0.072 | 3 | 1 | 8.4 | 1 |
| 5 | citric acid | 0.143 | 3 | 1 | 6.9 | 1 |
| 6 | tartaric acid | 0.028 | 2 | 2 | 9.8 | 1 |
| 7 | tartaric acid | 0.056 | 2 | 2 | 9.0 | 1 |
| 8 | none | 0 | 0 | 0 | 10.0 | 2 |
| 9 | boric acid | 0.012 | 0 | 3 | 9.9 | 3 |
| 10 | boric acid | 0.023 | 0 | 3 | 9.8 | 3 |
| 11 | boric acid | 0.046 | 0 | 3 | 9.5 | 3 |
| 12 | maleic acid | 0.022 | 2 | 0 | 9.5 | 3 |
| 13 | maleic acid | 0.043 | 2 | 0 | 8.5 | 3 |
| 14 | maleic acid | 0.087 | 2 | 0 | 7.3 | 3 |
| 15 | acetic acid | 0.011 | 1 | 0 | 9.7 | 3 |
| 16 | acetic acid | 0.022 | 1 | 0 | 9.4 | 3 |
| 17 | acetic acid | 0.045 | 1 | 0 | 7.8 | 4 |
| 18 | oxalic acid | 0.024 | 2 | 0 | 9.6 | 3 |

TABLE 1-continued

| Ex. | Dispersant agent | Wt. % of dispersant | # of $CO_2H$ groups | # of OH groups | pH of dispersion | viscosity |
|---|---|---|---|---|---|---|
| 19 | oxalic acid | 0.047 | 2 | 0 | 9.0 | 3 |
| 20 | oxalic acid | 0.094 | 2 | 0 | 7.7 | 3 |

Example 2. Evaluation of D50, Viscosity, and Hard Settling of Alumina Dispersions with or without Malic Acid Alumina dispersions (4000-gram) were prepared using 45%, 50%, or 55% $Al_2O_3$ with varying amounts of malic acid as the dispersant agent using the same procedure described in Example 1. Corresponding alumina dispersions without malic acid were prepared as comparative examples. D50 was measured with a Horiba LA950 laser scattering particle size distribution analyzer. Viscosity was measured by Brookfield cone and spindle viscometer (DV-II). Hard settling was assessed qualitatively based on two criteria: (1) the settling height of the packed particles after 24 hours of undisturbed rest, wherein the higher the packing height on the bottom, the better the performance, and (2) the ease of re-suspension by rotating the bottle 180 degrees back and forth slowly, wherein the faster the removal of the packed layer, the better the performance. Results from these studies are presented in Tables 2 and 3.

TABLE 2

| Ex. | Wt. % ($Al_2O_3$) | Wt. % (dispersant) | D50 (μm) after grinding | | | |
|---|---|---|---|---|---|---|
| | | | 0 h | 3 h | 6 h | 9 h |
| 21 | 45 | none | 28.6 | 8.8 | 3.3 | 0.9 |
| 22 | 45 | 0.045 | 28.6 | 8.1 | 2.8 | 0.4 |
| 23 | 50 | none | 28.6 | 14.1 | 6.0 | 2.8 |
| 24 | 50 | 0.005 | 28.6 | 11.0 | 5.2 | 3.5 |
| 25 | 50 | 0.05 | 28.6 | 11.4 | 4.6 | 0.6 |
| 26 | 50 | 0.5 | 28.6 | 13.0 | 5.8 | 4.4 |
| 27 | 55 | 0.055 | 28.6 | n.d. | n.d. | n.d. |

TABLE 3

| Ex. | Wt. % ($Al_2O_3$) | Wt. % (dispersant) | Viscosity (cps) after grinding | | | | Hard settling after grinding | | | |
|---|---|---|---|---|---|---|---|---|---|---|
| | | | 0 h | 3 h | 6 h | 9 h | 0 h | 3 h | 6 h | 9 h |
| 21 | 45 | none | n.d.* | >51 | >51 | >51 | n.d. | poor | poor | poor |
| 22 | 45 | 0.045 | n.d. | 40.0 | 20.0 | 10.6 | n.d. | better | better | better |
| 23 | 50 | none | n.d. | >51 | >51 | >51 | n.d. | poor | poor | poor |
| 24 | 50 | 0.005 | n.d. | >51 | >51 | >51 | n.d. | poor | poor | poor |
| 25 | 50 | 0.05 | n.d. | 31.0 | 14.6 | 12.8 | n.d. | better | better | better |
| 26 | 50 | 0.5 | n.d. | >51 | >51 | >51 | n.d. | better | better | better |
| 27 | 55 | 0.055 | n.d. | n.d. | n.d. | n.d. | n.d. | n.d. | n.d. | n.d. |

*n.d. = not determined

Para. A. A method of preparing a stable aqueous dispersion of alumina particles comprising: processing a slurry comprising alumina feed material, water, and a dispersant agent, wherein the alumina concentration is less than 55 wt. %; and the dispersant agent concentration is more than 0.01 wt. %; and wherein the dispersant agent has two or more carboxyl groups (COOH) and one or more hydroxyl groups (OH).

Para. B. The method of Para. A, wherein the dispersant agent concentration is less than or equal to 10 wt. %.

Para. C. The method of Para. A or Para. B, wherein the dispersant agent is an alpha hydroxyl dicarboxylic acid.

Para. D. The method of Para. A or Para. B, wherein the dispersant agent is selected from a group consisting of malic acid, citramalic acid, citric acid, isocitric acid, tartaric acid, and tartronic acid.

Para. E. The method of any one of Paras. A-D, wherein the processing comprises milling.

Para. F. The method of Para. E, wherein the milling is conducted by ball milling.

Para. G. The method of Para. E, wherein the milling is conducted by bead milling.

Para. H. The method of any one of Paras. E-G, wherein the milling is conducted for a period of 15 minutes to 24 hours.

Para. I. The method of any one of Paras. E-G, wherein the milling is conducted for a period of 15 minutes to 10 hours.

Para. J. The method of any one of Paras. A-I, wherein the slurry has a pH value greater than 7.

Para. K. The method of any one of Paras. A-J, wherein the slurry has a solids content of greater than 40 wt. %.

Para. L. The method of any one of Paras. A-K, wherein the dispersion has a viscosity of about 1 cps to about 40 cps.

Para. M. The method of any one of Paras. A-L, wherein the alumina particles in the dispersion have a particle size of greater than 0.5 µm.

Para. N. A method of increasing the rate of particle reduction in an alumina milling process comprising milling a slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH).

Para. O. The method of Para. N, wherein the dispersant agent concentration is less than or equal to 10 wt. %.

Para. P. The method of Para. N or Para. O, wherein the dispersant agent is an alpha hydroxyl dicarboxylic acid.

Para. Q. The method of Para. N or Para. O, wherein the dispersant agent is selected from a group consisting of malic acid, citramalic acid, citric acid, isocitric acid, tartaric acid, and tartronic acid.

Para. R. The method of any one of Paras. N-Q, wherein the milling is conducted for a period of 15 minutes to 24 hours.

Para. S. The method of any one of Paras. N-Q, wherein the milling is conducted for a period of 15 minutes to 10 hours.

Para. T. The method of any one of Paras. N-S, wherein the slurry comprising alumina feed material, water, and the dispersant agent has a pH value greater than 7.

Para. U. A method of decreasing the viscosity of an alumina slurry to less than about 40 cps comprising milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH).

Para. V. The method of Para. U, wherein the dispersant agent concentration is less than or equal to 10 wt. %.

Para. W. The method of Para. U or Para. V, wherein the dispersant agent is an alpha hydroxyl dicarboxylic acid.

Para. X. The method of Para. U or Para. V, wherein the dispersant agent is selected from a group consisting of malic acid, citramalic acid, citric acid, isocitric acid, tartaric acid, and tartronic acid.

Para. Y. The method of any one of Paras. U-X, wherein the milling is conducted for a period of 15 minutes to 24 hours.

Para. Z. The method of any one of Paras. U-X, wherein the milling is conducted for a period of 15 minutes to 10 hours.

Para. AA. The method of any one of Paras. U-Z, wherein the slurry has a pH value greater than 7.

Para. AB. The method of any one of Paras. U-AA, wherein the slurry has a D50 of less than about 5.0 µm.

Para. AC. A method of decreasing the D50 of an alumina slurry to less than about 5.0 µm, comprising milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH).

Para. AD. The method of Para. AC, wherein the dispersant agent concentration is less than or equal to 10 wt. %.

Para. AE. The method of Para. AC or Para. AD, wherein the dispersant agent is an alpha hydroxyl dicarboxylic acid.

Para. AF. The method of Para. AC or Para. AD, wherein the dispersant agent is selected from a group consisting of malic acid, citramalic acid, citric acid, isocitric acid, tartaric acid, and tartronic acid.

Para. AG. The method of any one of Paras. AC-AF, wherein the milling is conducted for a period of 15 minutes to 24 hours.

Para. AH. The method of any one of Paras. AC-AF, wherein the milling is conducted for a period of 15 minutes to 10 hours.

Para. AI. The method of any one of Paras. AC-AH, wherein the slurry has a pH value greater than 7.

Para. AJ. A method of decreasing the level of hard packing in an alumina slurry comprising: milling the slurry comprising alumina feed material, water, and a dispersant agent; wherein the alumina concentration is less than 55 wt. %; the dispersant agent concentration is more than 0.01 wt. %; and the dispersant agent has two or more carboxyl groups (COOH) and one or more hydroxyl groups (OH).

Para. AK. The method of Para. AJ, wherein the dispersant agent concentration is less than or equal to 10 wt. %.

Para. AL. The method of Para. AJ or Para. AK, wherein the dispersant agent is an alpha hydroxyl dicarboxylic acid.

Para. AM. The method of Para. AJ or Para. AK, wherein the dispersant agent is selected from a group consisting of malic acid, citramalic acid, citric acid, isocitric acid, tartaric acid, and tartronic acid.

Para. AN. The method of any one of Paras. AJ-AM, wherein the milling is conducted for a period of 15 minutes to 24 hours.

Para. AO. The method of any one of Paras. AJ-AM, wherein the milling is conducted for a period of 15 minutes to 10 hours.

Para. AP. The method of any one of Paras. AJ-AO, wherein the slurry has a pH value greater than 7.

Para. AQ. The method of any one of Paras. AJ-AP, wherein the slurry has a D50 of less than about 5.0 μm.

Para. AR. An aqueous dispersion of alumina prepared according to any one of Paras. A-AQ.

Para. AS. An alumina slurry composition comprising an alumina having a milling process content of greater than 40 wt. %, and a dispersant agent, wherein the dispersant agent has two or more carboxyl groups (COOH) and one or more hydroxyl groups (OH).

Para. AT. The composition of Para. AS, wherein the dispersant agent concentration is less than or equal to 10 wt. %.

Para. AU. The composition of Para. AS or Para. AT, wherein the dispersant agent is an alpha hydroxyl dicarboxylic acid.

Para. AV. The composition of Para. AS or Para. AT, wherein the dispersant agent is selected from a group consisting of malic acid, citramalic acid, citric acid, isocitric acid, tartaric acid, and tartronic acid.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

While the invention has been described in connection with specific embodiments thereof, it will be understood that the inventive methodology is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

What is claimed is:

1. A method of decreasing the viscosity of an alumina slurry to less than 40 centipoise comprising milling the slurry comprising alumina feed material, water, and a dispersant agent;
   wherein the alumina concentration is less than 55 wt. % and the dispersant agent concentration is more than 0.01 wt. % and less than or equal to 0.3 wt. %, based on the total weight of the alumina feed material, water, and dispersant agent; and the dispersant agent has two or more carboxyl groups (COOH) and one or more hydroxyl groups (OH).

2. The method of claim 1, wherein the dispersant agent concentration is about 0.02 wt. % to 0.2 wt. %.

3. The method of claim 1, wherein the dispersant agent is an alpha hydroxyl dicarboxylic acid.

4. The method of claim 1, wherein the dispersant agent is selected from a group consisting of malic acid, citramalic acid, citric acid, isocitric acid, tartaric acid, and tartronic acid.

5. The method of claim 1, wherein the milling is conducted for a period of 15 minutes to 24 hours.

6. The method of claim 1, wherein the slurry has a pH value greater than 7.

7. The method of claim 1, wherein the slurry has a D50 of less than 5.0 μm.

8. A method of decreasing the level of hard packing in an alumina slurry comprising:
   milling the slurry comprising alumina feed material, water, and a dispersant agent;
   wherein the alumina concentration is less than 55 wt. % and the dispersant agent concentration is more than 0.01 wt. % and less than or equal to 0.3 wt. %, based on the total weight of the alumina feed material, water, and dispersant agent; and the dispersant agent has two or more carboxyl groups (COOH) and one or more hydroxyl groups (OH).

9. The method of claim 8, wherein the dispersant agent concentration is about 0.02 wt. % to 0.2 wt. %.

10. The method of claim 8, wherein the dispersant agent is an alpha hydroxyl dicarboxylic acid.

11. The method of claim 8, wherein the dispersant agent is selected from a group consisting of malic acid, citramalic acid, citric acid, isocitric acid, tartaric acid, and tartronic acid.

12. The method of claim 8, wherein the milling is conducted for a period of 15 minutes to 24 hours.

13. The method of claim 8, wherein the slurry has a pH value greater than 7.

14. The method of claim 8, wherein the slurry has a D50 of less than 5.0 μm.

* * * * *